Patented July 25, 1939

2,167,144

UNITED STATES PATENT OFFICE 2,167,144

COMPOSITION OF MATTER

Raymond W. Barton and Warren M. Cox, Jr., Evansville, Ind., assignors to Mead Johnson & Company, Evansville, Ind., a corporation of Indiana No Drawing. Application March 24, 1937, Serial No. 132,744

14 Claims. (Cl. 99—11)

This invention relates to a stable composition of matter including fatty material, adapted to be added to aqueous media and to form a stable colloidal dispersion or emulsion of the fatty material in said aqueous media.

The main object of the invention is to produce a composition of matter of the character described which will not separate and which, when added to aqueous media, will form a colloidal dispersion or emulsion in which prolonged boiling, refrigeration, prolonged standing and/or centrifugation will not effect separation.

Another object is to produce a composition of matter of the character described which is clear and translucent, in which the fatty material is in apparent solution, and the physical appearance of which will not be impaired by long standing.

Another object is to produce a composition of matter including fatty material which when added to aqueous media will be equally distributed therein.

These and other objects are attained by combining, in suitable proportions, animal or vegetable oil, an emulsifying agent having mixed lipophillic and hydrophillic properties, and a polyhydric alcohol, and by adding the resultant composition of matter in suitable quantities to aqueous media.

More specifically, the invention is directed to the dispersion of vitamin bearing oils, such as fish liver oils, in milk or water, for edible purposes, and for this adaptation of the invention, the oil preferably is combined with a fatty acid ester of di-glycerol as an emulsifying agent, and with glycerol, and the resultant composition of matter is added in suitable quantities to said aqueous media. The invention may serve also for producing dispersion of oily material other than fish oils, and of oil-soluble drugs and pharmaceutical preparations in aqueous media.

Methods of dispersing oil in milk or water have been described and technically employed. Among such procedures are homogenization of an oil in skimmed milk, and emulsification by means of high frequency sound radiation of the sonic or supersonic type. Other procedures involve the use of emulsifying agents of various types. Lecithin has been most commonly used for this purpose, but more recently higher fatty acid esters of polyhydroxy alcohols (as in United States Patent No. 1,958,295) have been employed.

None of these procedures has been satisfactory for our purpose. Homogenization of oil in water is obviously impractical in the home or on a small scale; and this likewise applies to the use of sound radiation. The mere addition of an emulsifying agent to the oleaginous phase has not been successful in effecting satisfactory emulsions when added with stirring to relatively large amounts of water, in spite of the fact that such procedures may be of value in manufacturing or technical procedures. Even the best, for our purpose, of these prior art methods, namely, those employing certain higher fatty acid esters of polyhydric alcohols, do not produce colloidal dispersion of the excellence described in our invention.

We have discovered that by mixing of a fatty oil, for example, a fish liver oil, with an emulsifying agent such as a fatty acid ester of di-glycerol, and a polyhydric alcohol, as glycerol, a preparation suitable for our purposes can be produced.

It should be understood that the technical preparation of fatty acid esters of mono and di-glycerols does not yield only the theoretical product. It is practically impossible (save by involved chemical procedures) to prepare a pure single ester of a fatty acid and glycerol or polyglycerol. Esterification, in the presence of several hydroxyl groups, will not stop when only one, or two linkages have been satisfied. Thus, in the technical preparation of a mono-stearate of glycerol it would be expected that some distearate would be formed, as the usual procedure is to heat the free higher fatty acid with glycerol in the presence of a suitable catalyst, as traces of sodium soap, some of the preformed ester, or metallic catalysts, etc. Usually traces of catalyst, and some free glycerol, are in the final product which consists to some degree of mixtures of esters, although conditions can be regulated to produce a preponderance of the desired esterification product. Therefore, it is to be understood that the invention is not limited to the use of pure di-glycerol ester in the production of the composition of matter herein described.

Referring to the following example, it is to be understood that the optimum proportions of the three ingredients will vary with each change of ingredient.

*Example 1.*—Weigh 10 grams of a mixed fish liver oil (the liver oil of percomorph fishes), add 6 grams of a predominantly mono-oleic acid ester of a di-glycerol preparation (see United States Patent No. 2,023,388), and 84 grams glycerol.

Using the ingredients specified in Example 1, wherein the fish oil content is 10%, the range of ratios of emulsifier to glycerol may vary from .037 to .130.

The fatty material and the emulsifying agent (i. e., the polyglycerol ester) are mixed together, and then the mixture is triturated with the glycerol. The desired results are not obtained by triturating the emulsifying agent with the glycerol and then adding the fatty oil.

To form a clear, transparent "apparent solution", it is usually necessary to homogenize the oil, emulsifier and glycerol. While satisfactory preparations may be made by trituration in a mortar, they are not usually clear. However, by adding a crystalloidal sugar to the glycerol, as more fully hereinafter described, mere trituration gives a clear solution, and homogenization is not necessary. Both the homogenized and the triturated products will remain fully stable and when small amounts are added to water or milk, complete dispersion of the fatty oil in the liquid is obtained.

Egg lecithin may be substituted for the polyglycerol esters of oleic acid as the emulsifying agent.

Glycerol is not soluble in, or miscible with, fatty oils. In this respect it resembles other organic compounds of similar structural characteristics, as glycol, propylene glycol and other polyhydric alcohols. For attaining the object of our invention, however, we have found that glycol, propylene glycol and other homologous members of the glycol series cannot satisfactorily replace glycerine.

The invention may be employed in the preparation of many pharmaceutical products which may be kept on druggists' shelves for long periods of time. The initially clear solution, after prolonged standing at room temperature, becomes gradually less transparent but the effectiveness of the preparation in dispersing the fatty oil in aqueous media is not substantially impaired by the change in physical appearance. This change in physical appearance may be greatly retarded by adding to the ingredients in the heretofore described composition, preferably to the glycerol, certain crystalloidal sugars, soluble in water, such as sucrose. Urea may be substituted. Under certain conditions, dextrose may serve in place of sucrose. The following examples illustrate this modification of the invention.

*Example 2.*—18.75 gms. sucrose are dissolved in 81.25 gms. commercial glycerine (containing 3.8% water) by heating to 120–135° C. under vacuum. The resulting solution will contain approximately 99% total solids. 15 gms. of fish liver oil are mixed with 4.0 gms. of a predominantly mono-oleic acid ester of a di-glycerol preparation, and 81 gms. of the sucrose-glycerine solution added. The three substances are triturated in a mortar until a clear "solution" results. An equally good preparation may be made by homogenization or in a colloid mill.

*Example 3.*—18.75 gms. sucrose are dissolved in the minimum amount of water and added to 81.25 gms. of commercial glycerine (containing 3.8% water). The water is removed by heating under vacuum, until the water content is 2% or less. 20 gms. of fish liver are mixed with 5.2 gms. of a predominantly mono-oleic acid ester of a di-glycerol preparation, and 74.8 gms. of the sucrose-glycerine solution added. The material can then be triturated in a mortar, homogenized or run through a colloid mill, resulting in a clear "solution" which will remain stable for long periods of time.

In preparing these compositions, the fatty oil and emulsifying agent are mixed, and then the mixture is triturated with the sucrose-glycerol solution.

In Example 2, wherein 15% fish oil was specified, the ratio of emulsifier to the sucrose-glycerol solution is .05, but this proportion may vary from .032 to .090, and still result in satisfactory preparations. In Example 3, wherein the oil content was increased to 20%, the ratio of emulsifier to sucrose-glycerol content is .07, but this proportion may vary from .048 to .078. When the oil content is reduced to 10%, the ratio of emulsifier to sucrose-glycerol content may range from .028 to .105. Increase of the oil content in the mixtures leads to narrower permissible ratios of emulsifying agent to glycerol, or to the sucrose-glycerol solution. The objects of the invention are attained most effectively when 20% or less of fatty material is incorporated in the composition. In the compositions referred to in the following table, the same emulsifying agent (predominantly mono-oleic acid ester of a di-glycerol preparation) was used throughout, and the glycerol contained 18 to 20% sucrose.

| Fat | Permissible range of ratios of emulsifier to glycerol-sucrose |
|---|---|
| 5% | 0.005–0.163 |
| 10% | 0.028–0.105 |
| 15% | 0.032–0.090 |
| 20% | 0.048–0.078 |

The permissible ranges will vary with (1) the emulsifying agent, (2) the fatty oil employed, (3) the level thereof, (4) presence or absence of sucrose, and (5) the method employed to determine stability and the degree of stability desired.

We claim:

1. A stable composition of matter consisting essentially of fatty oil, glycerol, and a polyglycerol incompletely esterified with a higher fatty acid, in which the fatty oil is in apparent solution, and which, when added to relatively large amounts of aqueous media merely by stirring, will form a stable colloidal dispersion or emulsion of the fatty material in the aqueous media, in which prolonged boiling, refrigeration, long standing or centrifugation will not effect separation.

2. A stable composition of matter consisting essentially of fish liver oil, glycerol, and a polyglycerol incompletely esterified with a higher fatty acid, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation, the ratio of incompletely esterified polyglycerol to glycerol being within the following stated range: .037–.130.

3. A stable, clear and translucent composition of matter consisting essentially of fatty oil, glycerol, a polyglycerol incompletely esterified with a higher fatty acid, and crystalloidal sugar, in which the fatty oil is in apparent solution, and which, when added to relatively large amounts of aqueous media merely by stirring, will form a stable colloidal dispersion or emulsion of the fatty material in the aqueous media, in which prolonged boiling, refrigeration, long standing or centrifugation will not effect separation.

4. A stable, clear and translucent composition of matter consisting essenially of liver oil, glycerol, a polyglycerol incompletely esterified with a higher fatty acid, and crystalloidal sugar, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation, the oil constituting less than twenty-one per cent of the total, and the ratio of incompletely esterified polyglycerol to the glycerol and sugar combined being within the following stated range: .005–.163.

5. A stable composition of matter consisting essentially of an intimate mixture of vitamin bearing fish liver oil, glycerol, and a predominantly mono-oleic acid ester of a di-glycerol, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation.

6. A stable composition of matter consisting essentially of vitamin bearing fish liver oil, glycerol, and a predominantly mono-oleic acid ester of a di-glycerol, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation, the ratio of the predominantly mono-oleic ester of a di-glycerol to glycerol being within the following stated range: .037–.130.

7. A stable, clear and translucent composition of matter consisting essentially of vitamin bearing fish liver oil, glycerol, a predominantly mono-oleic acid ester of a di-glycerol, and sucrose, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation.

8. A stable, clear and translucent composition of matter consisting essentially of vitamin bearing fish liver oil, glycerol, a predominantly mono-oleic acid ester of a di-glycerol, and sucrose, in which the oil is in apparent solution, and which, when added to relatively large amounts of aqueous media merely by stirring, will form a stable colloidal dispersion or emulsion of the oil in the aqueous media, in which prolonged boiling, refrigeration, long standing or centrifugation will not effect separation, the oil constituting less than twenty-one per cent of the total, and the ratio of the predominantly mono-oleic ester of a di-glycerol to the glycerol-sucrose combined being within the following stated range: .005–.163.

9. A composition of matter consisting essentially of a fatty oil, glycerol, a polyglycerol incompletely esterified with a higher fatty acid, and crystalloidal sugar in which the fatty oil is in apparent solution, and which, when added to relatively large amounts of aqueous media merely by stirring, will form a stable colloidal dispersion or emulsion of the fatty material in the aqueous media, in which prolonged boiling, refrigeration, long standing or centrifugation will not effect separation, the fatty oil constituting less than twenty-one per cent of the composition, the glycerol and sugar having been combined in the proportion of 18–20 parts of the sugar to 80–82 parts of the glycerol, and the ratio of incompletely esterified polyglycerol to the glycerol and sugar combined being within the following stated range: .005–.163, the permissible ratios of the incompletely esterified polyglycerol to glycerol being narrowed within said range as the oil content is increased above five per cent of the total composition.

10. A composition of matter consisting essentially of fish liver oil, glycerol, a predominantly mono-oleic acid ester of di-glycerol, and crystalloidal sugar, in which the fish liver oil is in apparent solution, and which, when added to relatively large amounts of aqueous media merely by stirring, will form a stable colloidal dispersion or emulsion of the fatty material in the aqueous media, in which prolonged boiling, refrigeration, long standing or centrifugation will not effect separation, the fish liver oil constituting less than twenty-one per cent of the composition, the glycerol and sugar having been combined in the proportion of 18–20 parts of the sugar to 80–82 parts of the glycerol, and the ratio of di-glycerol ester to the glycerol and sugar combined being within the following stated range: .005–.163, the permissible ratios of the di-glycerol ester to glycerol being narrowed within said range as the oil content is increased above five per cent of the total composition.

11. A stable composition of matter consisting essentially of fatty oil, an oil soluble drug, glycerol, and a polyglycerol incompletely esterified with a higher fatty acid, in which the fatty oil is in apparent solution, and which, when added to relatively large amounts of aqueous media merely by stirring, will form a stable colloidal dispersion or emulsion of the fatty material in the aqueous media, in which prolonged boiling, refrigeration, long standing or centrifugation will not effect separation.

12. The step in the method of producing a stable colloidal dispersion or emulsion of fatty material in relatively large amounts of aqueous media, in which prolonged boiling, refrigeration, long standing or centrifugation will not effect separation, which consists in adding to a relatively large amount of aqueous media merely by stirring, a stable composition consisting essentially of a fatty oil, glycerol, and a polyglycerol incompletely esterified with a higher fatty acid.

13. The method of producing a stable composition of matter consisting essentially of fatty oil, glycerol, and a polyglycerol incompletely esterified with a higher fatty acid, in which the fatty oil is in apparent solution, which consists of mixing the fatty oil and incompletely esterified polyglycerol, and triturating the mixture with glycerol.

14. The method of producing a stable, clear and translucent composition of matter consisting essentially of fatty oil, glycerol, a polyglycerol incompletely esterified with a higher fatty acid, and sucrose, in which the fatty oil is in apparent solution, which consists of mixing the fatty oil and incompletely esterified polyglycerol, and triturating the mixture with the glycerol and sucrose.

RAYMOND W. BARTON.
WARREN M. COX, Jr.